Dec. 14, 1926.　　　　　　　　　　　　　　　　　　　1,611,112
G. M. GATES
BRAKE
Filed June 7, 1926　　　　　　　　2 Sheets-Sheet 1

George M. Gates,
INVENTOR
BY Victor J. Evans
ATTORNEY

WITNESS:

Dec. 14, 1926.
G. M. GATES
1,611,112
BRAKE
Filed June 7, 1926  2 Sheets-Sheet 2
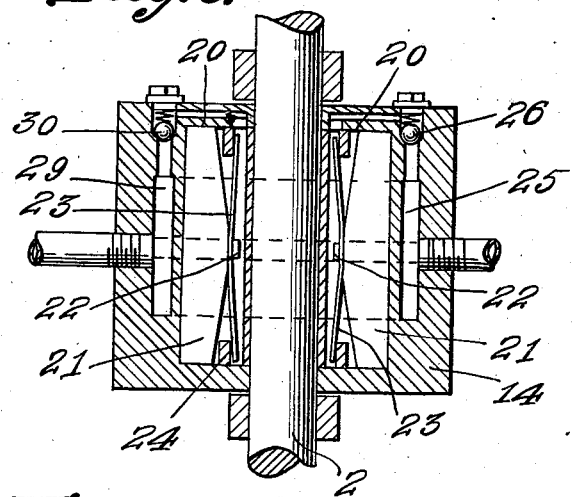
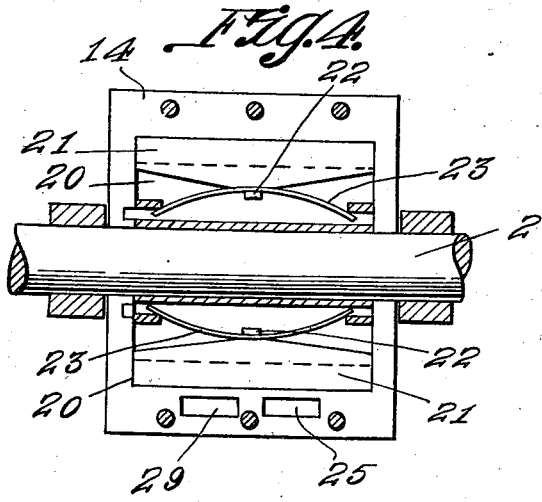
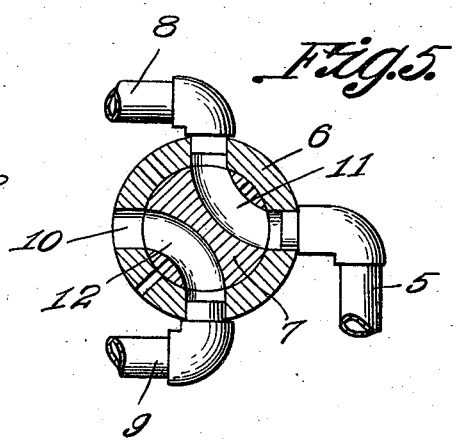
George M. Gates,
INVENTOR
BY Victor J. Evans
ATTORNEY
WITNESS:

Patented Dec. 14, 1926.

1,611,112

UNITED STATES PATENT OFFICE.

GEORGE MALCOLM GATES, OF TRENTON, NEW JERSEY.

BRAKE.

Application filed June 7, 1926. Serial No. 114,343.

My present invention has reference to a fluid braking means for the wheels of car trucks or the like.

An object is to direct a fluid pressure against pistons which are associated with the axles of the truck in a manner whereby the axles will be gently but effectively held from turning, and thereby brake the wheels with what may be termed a cushioning action.

A still further object is to arrange on the axles of a car truck, cylindrical members in the nature of hubs, each having pockets in which there are arranged pistons, spring means normally holding the pistons in the pockets, said hub being freely revoluble in the casing that has an elliptical bore and which is provided with ports for fluid under pressure that communicate with the said bore, and whereby fluid will be introduced into the pockets for the pistons to force the same outwardly and likewise be directed against the projected pistons so that the tendency will be to cause the axle to turn in a reverse direction, with the result that the device, when arranged on the axle, is freely revoluble when the fluid is not directed into the cylinder, but also whereby the axles and the wheels thereon will be held from turning in an easy and expeditious manner when fluid is admitted into the cylinder.

To the attainment of the above broadly stated objects and many others which will present themselves as the nature of the invention is better understood, reference is to be had to the drawings which accompany and form part of this application.

In the drawings:

Figure 3 is a sectional view on the line 3—3 of Figure 2.

Figure 4 is a view taken at right angles to that shown in Figure 3, one of the cylinder sections being removed from the other, and parts being in section.

Figure 5 is a sectional view through the four-way valve and its casing.

Figure 1:
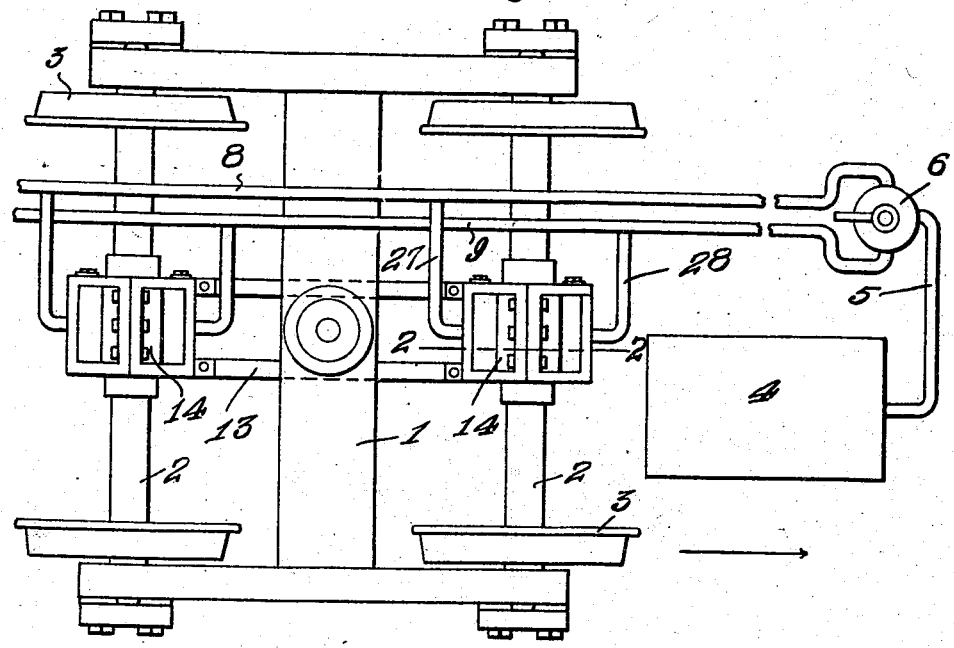
Figure 1 is a plan view of a railway truck provided with the improvement.
Figure 2:
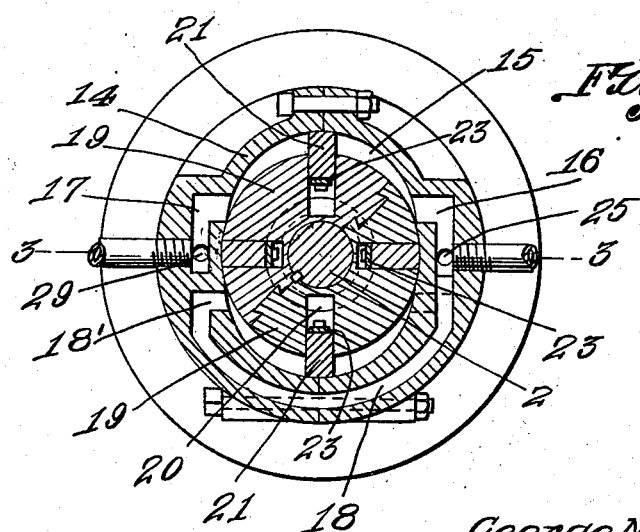
Figure 2 is an enlarged sectional view on the line 2—2 of Figure 1.

Referring now to the drawings in detail, the numeral 1 designates an ordinary car truck construction, 2 the axles thereon and 3 the wheels which are fixed on the axles.

At a suitable point away from the truck 1. there is a fluid storage tank 4 having an outlet pipe 5 that communicates with the casing 6 for a revoluble valve plug 7. The casing 6 has four right angularly arranged ports, in one of which the end of the pipe 5 is connected, a pipe 6 being connected to one of the ports arranged at a right angle with respect to the port for the pipe 8 and a pipe 9 being connected to the directly opposite end. The remaining port, indicated by the numeral 10, is in the nature of a bleed port. The core 7 has curved passages 11 and 12 therein to register with the ports for the pipes 5, 8 or 9, or with the port 10 and either of the pipes 8 or 9.

Suitably supported on the truck, by means 13, and arranged around each of the axles 2, there is a two-part cylindrical casing 14. The confronting ends of the casing are flanged outwardly and passed through these flanges there are the means for securing the casing sections. This means is in the order of ordinary bolts engaged by nuts. The casing 14 has a cylindrical bore 15 and has its sides provided with angle passages 16 and 17 that communicate with what I will term the upper portion of the bore 15. The casing 14 has a curved passage 18 provided with an angle port 18′ disposed below the port or passage 17, and this port communicates with what I will term the lower part of the elliptical bore 15. Fixed on each axle and received in the elliptical bore of each casing 14, there is a two-part hub 19. The hub is in the nature of a cylindrical member, and the said hub is provided with right angularly arranged pockets 20. In each of these pockets there is a plate that provides a piston 21. The inner edges of the pistons are preferably inclined from the ends thereof toward the center, and the said central portion of each piston is formed with a finger 22 that engages with the central portion of an arched spring 23. The pockets in the hub have inwardly extending fingers or flanges 24 with which the ends of the flat springs 23 contact. These springs 23 normally draw the pistons in their pockets 20, so that when fluid is not directed into the cylinders there will be no frictional engagement between the pistons and the bore of the said cylinders. The result is that the axles may be freely revolved.

The ports 16 and 17 have by-passes 25 in the nature of angle ports which communicate with the respective pockets 20. A spring influenced ball valve 26 normally closes the angle ports, and the purpose of this arrangement will presently be apparent.

The pipe 8 has branches 27 that are attached to the cylinders and communicate with the ports 16, while the pipe 9 has branches 28 connected to the cylinders and communicating with the ports 17.

The operation of the improvement will be briefly described as follows: We will suppose that the truck is traveling in the direction of the arrow in Figure 1, and it is desirable to bring the truck to a stop. The valve plug 7 is turned to the position illustrated in Figure 5 of the drawings, which will direct the fluid through the pipe 8 and its branches 27 into the port 16 of the cylinders. Part of this fluid will flow through the bypass 25 into the pockets 20 to influence the pistons 21 outwardly through their pockets against the influence of the springs 23. The major volume of fluid will be directed against the projected pistons which are in the widened upper and lower parts of the bore 15, it being apparent that part of this fluid will flow through the passage 18, port 18', into the bore of the cylinder against the lower piston 21 so that both the projected pistons will be acted on by the fluid. This fluid will have a cushioning effect upon the pistons and the fluid will find an outlet through the port 17, branches 28, pipe 9, port 12 in the plug 7 and the port 10 in the valve casing 6. If desired, additional bleed ports may be provided between the plug 7 and the casing 6 as disclosed by Figure 5 of the drawings.

A bypass 29, similar to the bypass 25, establishes a communication between the port 17 and the pockets 20 for the pistons 21. This bypass has its angle branches normally closed by a spring influenced ball valve 30 similar to the ball valve 26. By this arrangement it will be noted that when the fluid is directed through the pipe 28 into the cylinders, the fluid passing through the bypass 25 cannot enter the bypass 29.

When the truck is traveling in an opposite direction the plug is turned to establish a communication between the pipes 5 and 9 and the operation is precisely similar to that above described, except, of course, the fluid passes through the port 17 to act on the pistons.

The simplicity of my improvement and the advantages thereof will, it is thought, be perfectly apparent when the foregoing description has been carefully read in connection with the accompanying drawings, it being understood that I do not wish to be restricted to the precise details of construction herein set forth and hold myself entitled to make such changes therefrom as fairly fall within the scope of what I claim.

Having described the invention, I claim:—

1. The combination, a revoluble member having a fixed hub which is provided with pockets, a piston in each pocket, a stationary cylinder enclosing the hub, means for introducing fluid under pressure into the cylinder and into the pockets of the hub to force the pistons outward of the said pockets and to act against the projected pistons to resist the turning of the revoluble member, and an exhaust for the spent fluid.

2. The combination, a revoluble member having a fixed hub which is provided with pockets, a piston in each pocket, spring means normally housing the pistons in the pockets, a fixed cylinder surrounding the hub, means for introducing a fluid under pressure into the cylinder and into the pockets to force the pistons outward of their pockets and to act against the projected pistons to resist the turning of said revoluble member, and an exhaust for the spent fluid.

3. The combination, a revoluble member, a sectional hub fixed thereon and said hub having right angular pockets, a piston in each pocket, spring means holding the pistons in the pockets, a fixed cylinder having an elliptical bore in which the hub is received, means for introducing fluid under pressure through either side of the cylinder, and into the pockets to force the pistons outward thereof, and to act upon the projected pistons to resist the turning of said member in either of two directions, and an exhaust for the spent fluid.

4. The combination, an axle having wheels on the ends thereof, and turnable in either of two directions, a sectional hub fixed on the axle, said hub having rightangular longitudinally disposed pockets therein, a piston in each pocket, a flat spring having its ends anchored and its center secured to the piston therein for influencing the piston inward of the pocket, and said pockets having ports communicating therewith, a fixed cylinder formed of two sections, and having an elliptical bore in which the hub is received, said pocket having oppositely arranged ports and passages leading therefrom communicating respectively with the widened ends of the cylinder and with the pockets, and valve controlled pipes for conducting fluid under pressure, connected with said ports, as and for the purpose set forth.

In testimony whereof I affix my signature.

GEORGE MALCOLM GATES.